United States Patent [19]
Shimirak et al.

[11] Patent Number: 5,406,702
[45] Date of Patent: Apr. 18, 1995

[54] METHOD FOR SEALING AN ELECTRICAL SOCKET AND PLUG ASSEMBLY

[75] Inventors: Gerald L. Shimirak, Danville; Jackie Thomas, East Palo Alto; Miguel Morales, Pacifica, all of Calif.

[73] Assignee: Raychem Corporation, Menlo Park, Calif.

[21] Appl. No.: 99,013

[22] Filed: Jul. 29, 1993

Related U.S. Application Data

[60] Division of Ser. No. 802,950, Dec. 3, 1991, Pat. No. 5,246,383, and a continuation-in-part of Ser. No. 791,749, Nov. 12, 1991, Pat. No. 5,195,125, which is a continuation of Ser. No. 584,325, Sep. 17, 1990, Pat. No. 5,111,497.

[51] Int. Cl.⁶ ............................................. H01R 43/16
[52] U.S. Cl. ................................. 29/883; 174/DIG. 8; 264/230
[58] Field of Search ....................... 29/883; 264/230; 174/DIG. 8

[56] References Cited

U.S. PATENT DOCUMENTS

| | | | |
|---|---|---|---|
| 4,186,986 | 2/1980 | Shoemaker | 439/521 X |
| 4,425,017 | 1/1984 | Chan | 439/201 X |
| 4,824,390 | 4/1989 | Crane et al. | 439/271 |
| 4,864,725 | 9/1989 | Debbaut . | |
| 4,917,617 | 4/1990 | Smith | 439/135 |
| 4,927,386 | 5/1990 | Neureth | 439/201 X |
| 4,998,894 | 3/1991 | Gronvall | 439/521 |
| 5,140,746 | 8/1992 | Debbaut . | |

FOREIGN PATENT DOCUMENTS 319306   6/1989   European Pat. Off. ............ 439/936

*Primary Examiner*—Carl J. Arbes
*Attorney, Agent, or Firm*—Townsend and Townsend Khourie and Crew

[57] ABSTRACT

An environmentally protected electrical socket and plug assembly retains environmental security throughout repeated connections and disconnections. The socket and plug assembly includes a socket containing an electrical conductor and adapted to insertably receive a plug, an environmental sealant at least partially filling the socket so that the sealant is at least partially displaced from the socket when the plug is inserted into the socket, and an elastomeric containment means for containing displaced sealant when the plug is inserted into the socket and for urging the sealant back into the socket when the plug is removed.

15 Claims, 3 Drawing Sheets

METHOD FOR SEALING AN ELECTRICAL SOCKET AND PLUG ASSEMBLY

CROSS REFERENCE TO RELATED APPLICATIONS

This is a division of application Ser. No. 07/802,950, filed Dec. 3, 1991, now U.S. Pat. No. 5,246,383, and a continuation in part of application Ser. No. 07/791,749, filed Nov. 12, 1991, now U.S. Pat. No. 5,195,125, which is completely incorporated herein by reference for all purposes, and which is a continuation of U.S. Pat. No. 5,111,497, Ser. No. 07/584,325, filed Sep. 17, 1990, which also is completely incorporated herein by reference for all purposes.

BACKGROUND OF THE INVENTION

The present invention relates to the field of electrical connectors, especially for telephone communication equipment, and more particularly to environmentally protected electrical connections. Most particularly, in one embodiment the present invention provides a method and apparatus for protecting telephone jacks from moisture and corrosion, such as often found in coastal regions, islands, and the like.

Telephone line connections at subscriber locations are commonly made with the RJ11 type of plug and socket connector. These connectors are exemplary of electrical connections susceptible to failure from oxidation, corrosion, humidity, salt, and the like, especially in the presence of a live voltage on the conductors within the connector.

For example, it is sometimes difficult to establish and maintain an adequate environmental seal in a removable male RJ11 plug, particularly when wires lead from the male RJ11 plug. Accordingly, moisture and other environmental contaminants are allowed to enter such plugs, sometimes resulting in corrosion and/or failure of the connection of the tip and ring connections in the socket/plug combination. RJ11 sockets are likewise subject to moisture contamination and corrosion, as well as being subject to dust buildup. In hot, humid environments such as in Florida and along the Gulf Coast of Texas, failure can occur within several months of installation. Servicing these failures is costly for the consumer or the telephone company.

Sometimes problems have also arisen in connection with test ports for customer telecommunications equipment such as remote terminals at customer facilities, described in the parent application, and the like. It is often desirable to provide an RJ11 connector of the type well known to those of skill in the art, or other such connector, at an external location at subscriber facilities such as a junction box leading to a house or a remote terminal of the type described above. Previously, such access is provided by installing a female RJ11 socket at such locations which is normally connected to a male RJ11 plug. The tip and ring wires (among other wires in some cases) lead from the female RJ11 socket, and connect to tip and ring connections in the male RJ11 plug, thereafter leading into the subscriber facility. When it is desired to connect test equipment to the RJ11 female socket, the plug is removed, and another male RJ11 is inserted into the female socket, thereby providing tip and ring connections for the test equipment. Even though the equipment may be contained in a protective housing, such arrangements are sometimes subject to much of the same moisture/corrosion degradation.

It would therefore be desirable to provide an improved method and associated apparatus for protecting plug and socket electrical connectors from the environment. In particular, an environmentally resistant RJ11 plug and socket apparatus would be especially desired.

SUMMARY OF THE INVENTION

An improved method and apparatus for environmentally protecting electrical connections are disclosed which provide in various embodiments for the previously recited desirable features, as well as many others obvious to the ordinary skilled electrical connection designer after reviewing this disclosure. In a preferred embodiment the invention provides for an environmentally protected electrical socket and plug assembly that retains environmental security throughout repeated connections and disconnections. For example, in the case of an RJ11, the present invention provides for environmental protection after repeated electrical connection and disconnection of telephone equipment.

An improved socket and plug electrical connector is disclosed. According to one embodiment the invention includes a socket containing an electrical conductor and adapted to insertably receive a plug, an environmental sealant at least partially filling the socket so that the sealant is at least partially displaced from the socket when the plug is inserted into the socket, and an elastomeric containment means for containing displaced sealant when the plug is inserted into the socket and for urging the sealant back into the socket when the plug is removed.

A further understanding of the nature and advantages of the invention may be had with reference to the following figures and description.

DETAILED DESCRIPTION OF THE PREFERRED EMBODIMENTS

Figure 1:
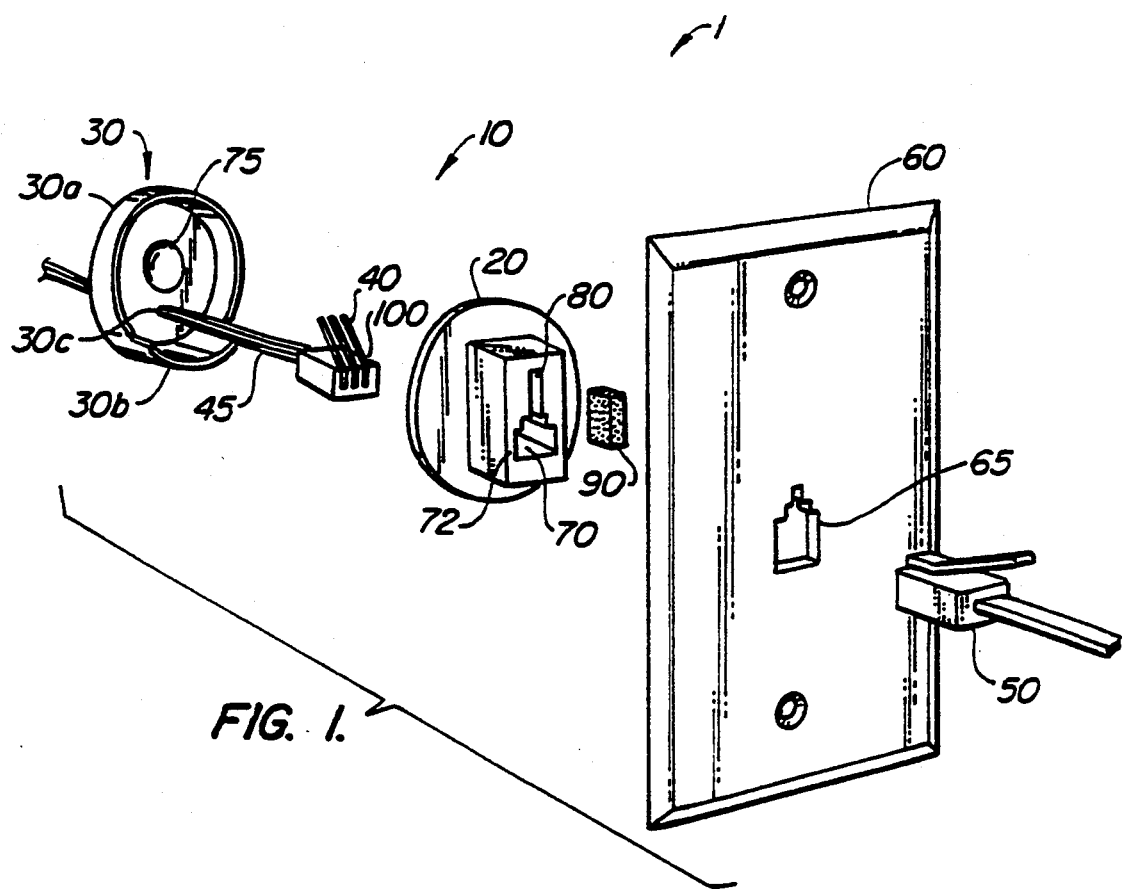
FIG. 1 is an exploded view of an RJ11 embodiment of the present invention.

An RJ11 wall socket and plug apparatus 1 is illustrated in the FIG. 1 exploded view. The socket and plug apparatus 1 includes a female RJ11 socket assembly 10, which comprises a female RJ11 socket 20, and an elastomeric containment diaphragm 30 mounted on the back of the socket 20. The contacts 40 are housed within the socket 20, and the wires 45 connect to the contacts 40. The wires 45 pass through containment diaphragm 30 individually, or, as illustrated, together through a common passage. The socket and plug apparatus 1 further includes an RJ11 plug 50 and a faceplate 60 having an opening 65 through which the RJ11 plug 50 may connect to the RJ11 socket assembly 10. In order to protect the socket and plug apparatus 1 from moisture and other corrosives, socket assembly 10 is filled with an environmental sealant. The environmental sealant is preferably a hydrophobic dielectric in order to exclude moisture and insulate the wires and contacts. Gels are preferred, with the most preferred being silicone gels. The preferred gels have a cohesiveness greater than their tack (adhesion to other surfaces), so that when the plug is removed from the socket the gel will release the plug rather than some portions clinging to the plug and separating from the main body of gel within the socket. The gel requires a sufficient adhesion, however, so that it will form an acceptable seal around the contacts, wires, and other portions of the apparatus in need of environmental protection.

The sealant should have a hardness sufficient to provide lasting protection against environmental contaminants. On the other hand, the sealant should be soft enough to be displaced by the plug and conform to the shape to the socket assembly and adequately seal it. The gel's hardness also impacts a customer preference: the ability to hear a click when the RJ11 plug is fully inserted and latches into the RJ11 socket. If the sealant is too stiff, this click will be muted.

The sealant's elasticity is also an important characteristic, as it helps to return the sealant to protective placement when the plug is removed.

A wide variety of sealants are available for this use, including, for example, elastic hot melt materials, greases, and flexible epoxies. Preferably the sealant is a dielectric gel such as aliphatic urethane gels, urea gels, silicone gels, and thermoplastic gels like styrene-ethylene-butylene-styrenes, including those disclosed in U.S. Pat. Nos. 4,634,207; 4,600,261; 4,643,924; 4,865,905; 4,662,692; 4,595,635; 4,680,233; 4,716,183; 4,718,678; 4,777,063; and 4,942,270, which are completely incorporated herein by reference for all purposes. Yet another preferred gel is Dow Sylgard gel.

Preferred gels used in conjunction with the present invention include those having a cone penetration value from about 50 to about $350 \times 10^{-1}$ mm, preferably about 100 to about $300 \times 10^{-1}$ mm, and most preferably about 100 to about $250 \times 10^{-1}$ mm. Preferred gels also have an ultimate elongation of at least about 50%, preferably at least about 100%, and most preferably at least about 200%. Alternatively from cone penetration, another measurement for hardness is Voland hardness. The Voland hardness is generally measured on a Voland texture analyzer apparatus. Voland hardnesses from about 15 grams to at least about 50 grams are acceptable for the gel, with preferred gels having Voland hardnesses from about 20 to about 40 grams.

In the embodiment of FIG. 1, the preferred environmental sealant is a silicone gel 70 having a Voland hardness of about 31±6 grams, a stress relaxation of about 28±10%, and a tack of about 17±5 grams. Socket assembly 10 is preferably substantially completely filled with gel 70, as are any interior spaces or cavities of RJ11 plug 50. When plug 50 is inserted into opening 72 of socket assembly 10, it will displace some of gel filling 70.

The preferred embodiment therefore has features that help retain gel 70 within the assembly, where it is needed. A primary feature designed for this purpose is the elastomeric containment diaphragm 30. The containment diaphragm 30 is preferably made of a flexible material such as rubber, most preferably Santoprene rubber made by MonteSanto Corp. Other acceptable materials include flexible plastic, rubberized cloth, and essentially any flexible material that can be formed into a diaphragm or membrane may be used. The containment diaphragm 30 is flexible enough to make room for gel displaced by the insertion of the RJ11 plug 50, but it preferably is also stiff enough create a force urging the gel 70 back into the socket 20 when the plug 50 is removed, so that the gel 70 covers and protects the contacts 40. This force also places the gel 70 under pressure when the plug 50 is inserted, and this pressure further helps to keep out corrosive contaminants. The diaphragm 30 is shown mounted opposite of the opening 72 for the plug 50, which applies a stronger force to urge the return of stiff gels into the socket. Preferably the diaphragm 30 has a Shore A hardness of about 20 grams to about 100 grams, more preferably about 45 grams to about 75 grams, and most preferably a hardness of about 55 grams to about 65 grams.

The containment diaphragm 30 also has a dimple or recess 75 inside the diaphragm, forming a cavity that provides an additional pocket of containment space into which gel 70 may be displaced upon the insertion of the plug 50. The diaphragm 30 is not a strict necessity for the embodiment of the invention which includes the gel adhesive coating 100 on the electrical contacts, but without the diaphragm gel 70 has a tendency to flow out the back of the RJ11 socket 20 and not return to its protective position within the socket 20 when the RJ11 plug 50 is removed. This tendency is especially pronounced after many repeated insertions and removals of the plug.

The diaphragm 30 also works in conjunction with the gel 70 to provide a seal around the wires 45 as they exit the socket assembly, and such an elastomeric diaphragm could be usefully added to the RJ11 test ports of parent case Ser. No. 07/791,749. Many prior systems have had a very difficult time sealing even one wire in such a situation, let alone four, but the combination of the diaphragm and gel seals up to eight or more wires. This sealing of the wires could also be achieved by the diaphragm in conjunction with some other environmental sealant, such as a grease, rather than the gel, but such sealing is inferior after repeated reentries.

A second feature addressing the displacement of gel 70 is an expansion slot 80 at the upper side of socket 20. The expansion slot 80 provides an additional space for displacement in a different direction than that provided by diaphragm 30. The expansion slot 80 may optionally contain a foam rubber or spring displacement insert 90 to urge gel 70 back into protective position of the contacts 40 when the plug 50 is removed. If used, foam insert 90 is preferably a very soft, closed foam rubber, with a density of about 2 to about 15 pounds per cubic inch, a Shore OO hardness of about 10 to about 35, and a 25% compression pressure of about 2 to about 9 psi. One such foam is a foam sold under the description V710 black by Pacific Die Cut Corp. of California. V710 foam has a density of about 7 pounds per cubic inch, a Shore OO hardness of about 21, and a 25% compression pressure of about 2.5 psi.

Yet another feature of the invention to enhance the gel 70 surrounding and protecting the contacts 40, includes on a portion of contacts 40 a coating 100 having an affinity for the gel 70. The contacts 40 are preferably gold coated, and sealants tend not to stick well to the gold. As shown in FIG. 1, the coating 100 is applied to the front portion of the contacts 40. The coating 100 preferably forms a strong bond with the contacts 40, and also is preferably adhesive to the sealant 70. For gels, a suitable material is a tacky or adhesive base component of the gel. In this way, when the plug 50 is inserted, a portion of the gel 70 remains attached to the front of contacts 40; the gel is stretched out and the main portion of it is pushed in front of the plug 50, but thin strands remain attached. When the plug 50 is then removed, the gel will contract and be pulled back to the front of the contacts 40, protecting them. A sufficient portion of the contacts 40 must be free of the coating so that the contacts 40 may form electrical connections with any corresponding contacts in the plug 50. In the preferred embodiment the coating 100 is a silicone rubber adhesive that is applied to the contacts 40; this may be Dow Corning RTV silicone rubber sold as Silastic T silicone rubber, and having a hardness of 20 as reported by Dow Corning.

Preferably the coating is applied at a preliminary stage of construction and allowed to harden. Then when the socket assembly is filled with silicone gel, the gel, as it cures, will bond with the coating. Of course, essentially any material that forms a good bond both with the contacts and with the sealant may be used for the coating. The coating also performs the useful function of sealing the holes of contacts 40 of their plastic holder. For this purpose the coating does not need to bond with the gel.

Figure 2A:
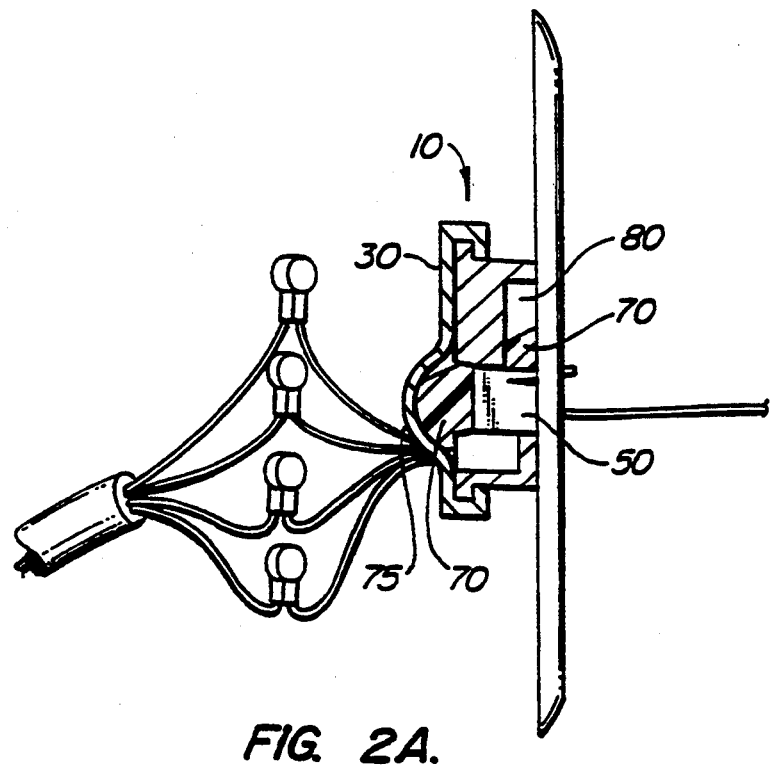
FIGS. 2A and 2B are cross-sectional views of an RJ11 embodiment, connected and disconnected.
Figure 2B:
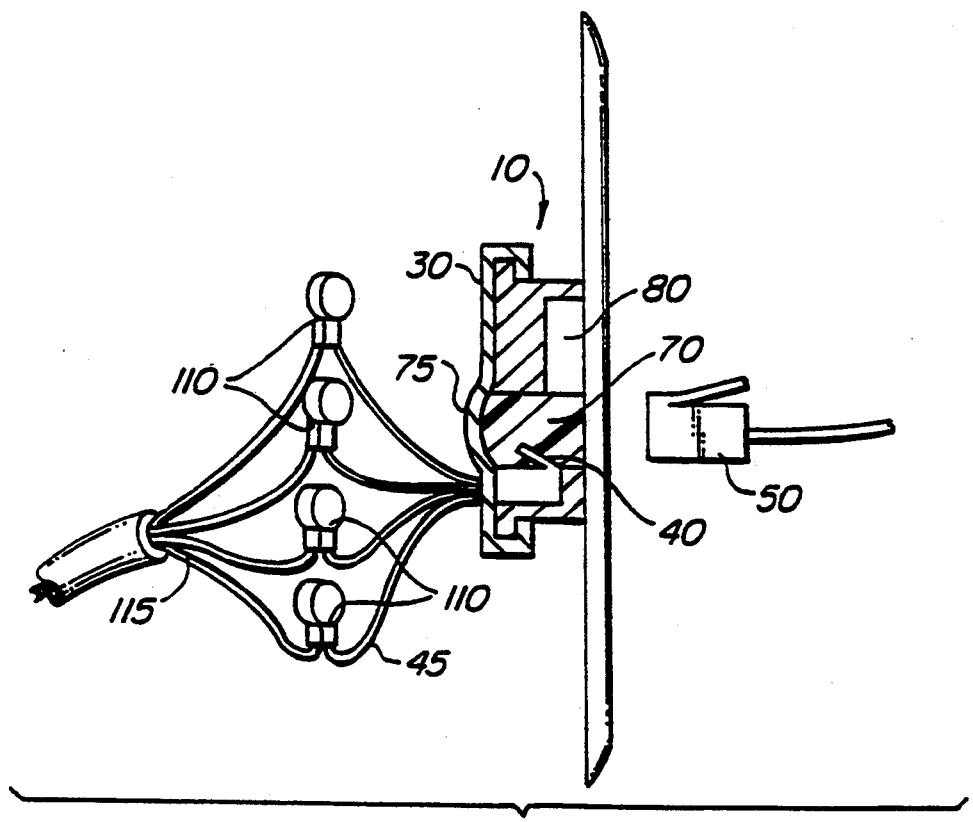

The behavior of plug and socket apparatus 1 when connected and disconnected is illustrated in FIGS. 2A and 2B. In FIG. 2A, the gel filled male RJ11 plug 50 has been inserted into the socket assembly 10. Some of the gel 70 has been pushed into the slot 80, and another portion of the gel 70 has pushed against the diaphragm 30, causing the diaphragm 30 and especially the dimple 75 to expand. In FIG. 2B the plug 50 was removed from the socket assembly 10, and in that process the gel 70 recedes from the slot 80, and the diaphragm 30 and the dimple 75 have contracted, to push the gel 70 back into the opening 72, to cover and protect the contacts 40. Also shown in this drawing are gel filled connectors 110 that are used to connect wire leads 45 to telephone line wires 115.

The qualities of the sealant interact with the other components in a number of ways. For instance, the desirability of the foam insert 90 may entirely disappear if the gel 70 is sufficiently tacky. In this case the gel will stick to the plug 50 as the plug is being removed, and the gel will be pulled down from the slot 80 into the opening 72 before releasing the plug 50.

The characteristics of the containment diaphragm 30 also largely depend upon the nature of the sealant 70. A stiffer, i.e., harder, gel requires a more resilient diaphragm to push the gel back into opening 72 upon the removal of plug 50. If a grease is used, and the diaphragm is primarily for working with the grease to provide a superior seal around the wires exiting from the rear of the socket assembly, the diaphragm may be rather stiff. Of course, it not necessary that diaphragm 30 have a uniform hardness throughout, but merely that the net effect conforms to these guidelines. It is also generally preferably that the material of diaphragm 30 is compatible with the sealant, so that, for example, any cure time or ultimate hardness of the sealant is not adversely affected by a reaction with the diaphragm.

Figure 3:
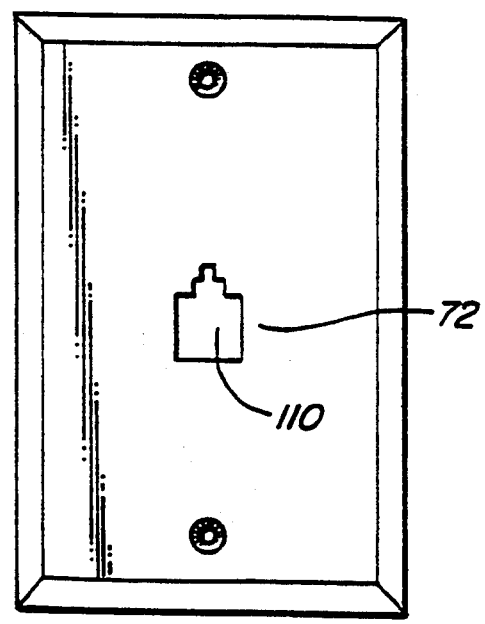
FIG. 3 is a front view of an RJ11 wall plate and exposed gel surface.

The tackiness of the sealant may also determine the need for other features. If the sealant is sufficiently tacky, a dust cover of some sort may optionally be provided to avoid dust accumulation on the exposed surface of the sealant (when no plug is inserted). Alternatively, a tacky gel can have a less tacky surface skin 110 in the opening 72, as shown in FIG. 3. This skin can be formed chemically, depending upon the type of gel or other sealant. Gels can also be skinned by UV treatment. This skin would prevent the exposed surface of the gel 70 from collecting excessive dust, but would be soft enough to yield when plug 50 is inserted.

Construction

The RJ11 plug and socket sets according to the present invention may be constructed using a number of preexisting parts. The RJ11 sockets 20 are available in many shapes, and a diaphragm may be easily designed to fit most of them. The diaphragm 30 has a lip 30a extending around its circumference. The lip 30a further includes an extension 30b which overlaps the portion of the RJ11 socket 20 where contacts 40 are inserted. This area may under some circumstances benefit from an even further extended lip or from glue to help prevent leakage of gel during the filling process and before curing.

The front portions of the contacts 40 are covered with the coating 100, if desired, which is allowed to harden. The wires 45 are passed through a small hole or conductor aperture 30c in the diaphragm 30 and the contacts 40 are inserted into the socket 20. The diaphragm 30 is then attached to the socket 20. Thereafter, the space between the socket and the diaphragm is filled with sealant.

Figure 4:
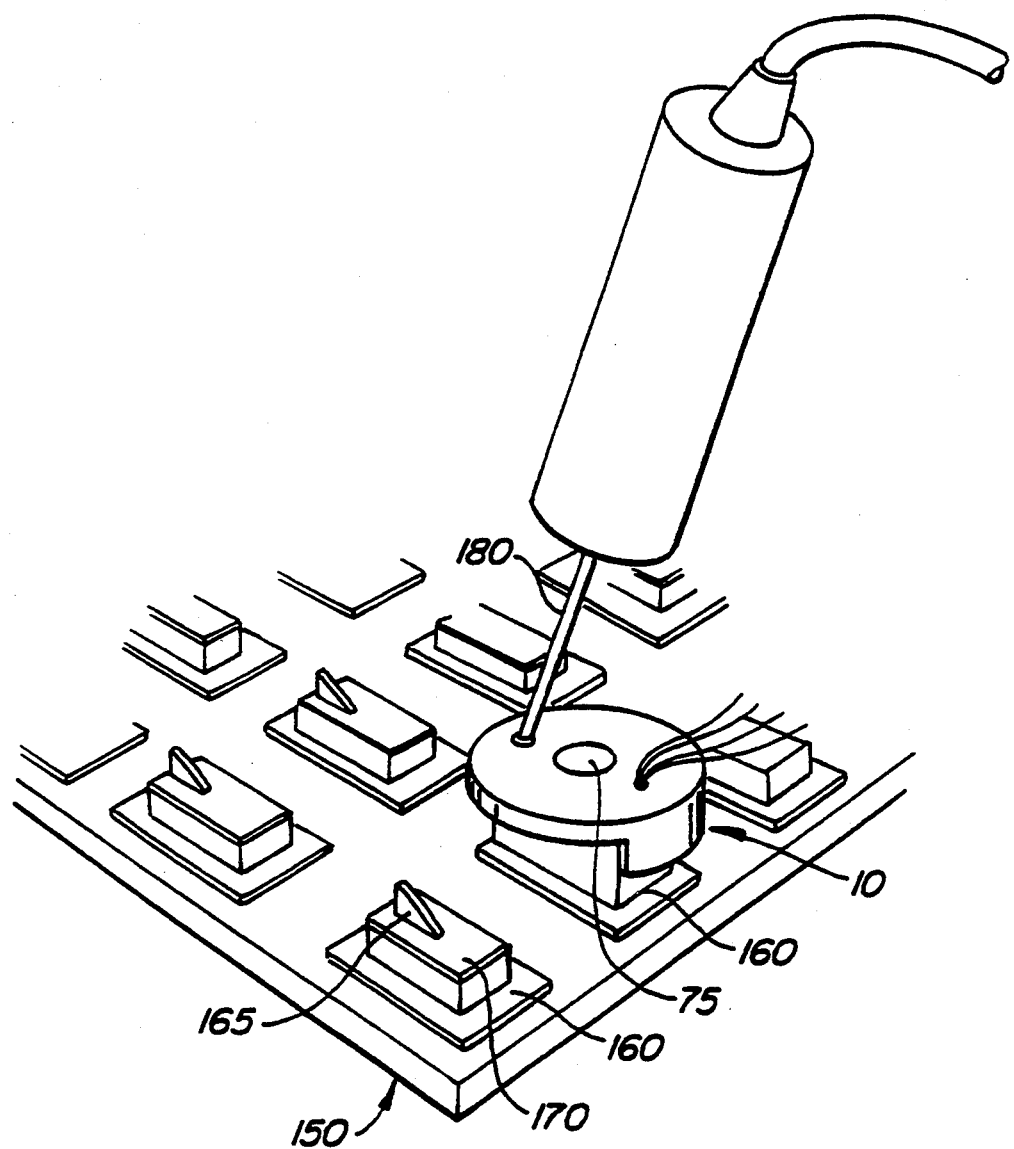
FIG. 4 illustrates a gel filling fixture.

Gels used as environmental sealants need to be cured before use. Before curing they can be quite liquid and difficult to contain properly within socket assembly 10. To aid in the gel filling process, a gel filling fixture as shown in FIG. 4 is used.

The gel filling fixture 150 contains an array of filling molds 160. The socket assembly 10 tightly affixes to a filling mold 160, which as shown here contains a prong 165 which leaves an empty space in the slot 80 of the socket assembly 10, into which gel can move when displaced during use. If filling mold 160 is made of a material to which the gel will strongly adhere, a nonstick sheath 170 or mold release material may be employed to ease the removal of the filled socket. Once the socket assembly 10 is firmly attached, the uncured gel is injected into the assembly, preferably through a needle 180. Injecting the gel through a point near to the dimple 75 helps prevent the formation of unwanted air bubbles at the border of the gel with the diaphragm. The gel is at this point very runny, and the diaphragm 30 plays a significant role in retaining the liquid gel in place until it gels. Upon curing of the gel, the socket assembly can be removed from the filling mold 160. If a skin is desired on the exposed surface of the gel, it can be formed at this time.

Figure 5:
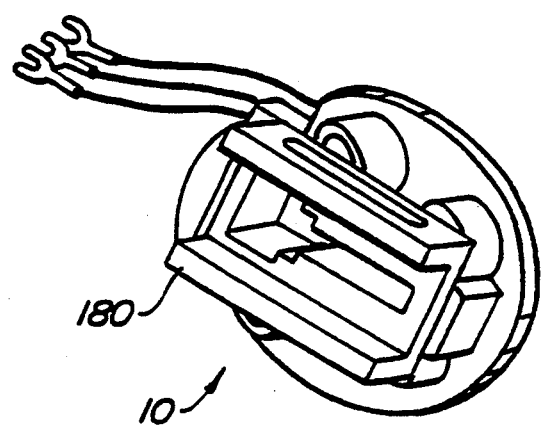
FIG. 5 is an angled front view of an RJ11 socket.

To provide a tight seal between the filling mold and the socket assembly, the socket 20 may be constructed with a lip as shown in FIG. 5. The lip 180 fits around the filling mold 160 and helps create a tight seal. Alternatively, the filling mold 160 could be made with a lip to fit about the socket 20.

Examples

Plug and socket assemblies prepared in accordance with this invention were tested under extremely harsh conditions to evaluate their environmental resistance. Fifteen connection/disconnection reentries were performed with each socket and plug. A first group of sockets and plugs were then subjected to immersion in salt water for fourteen days and still exceeded isolation resistance requirements between various terminals while immersed. A second group was exposed salt fog for thirty days, and also exceeded isolation resistance requirements between various terminals. These test results are far superior to those obtainable with comparable prior art socket and plug assemblies.

Conclusion

The inventions claimed herein provide a substantially improved method and device for environmentally protecting electrical socket connections. It is to be understood that the above description is intended to be illustrative and not restrictive. Many embodiments will be apparent to those of skill in the art upon reviewing the above description. By way of example the inventions herein have been illustrated primarily with regard to RJ11 telephone sockets, but teachings herein can also be applied to other electrical socket connections, such as power outlet sockets in a high humidity area such as an oil rig. By way of further example, the specific embodiments described herein have employed diaphragms surrounding the circumference of the socket and mounted directly opposite the entry point of the plug, but both of these characteristics could be varied. By way or still further example, the specific connectors and the roles of the male and female connectors disclosed herein could readily be reversed or altered. The scope of the inventions should, therefore, be determined not with reference to the above description, but should instead be determined with reference to the appended claims, along with the full scope of equivalents to which such claims are entitled by the ordinary skilled artisan.

What is claimed is:

1. A method of sealing an electrical socket and plug connection, the socket capable of receiving the plug in a region at a side of the socket, said method comprising the steps of:
   a) attaching an elastomeric diaphragm to the socket opposite the side of the socket capable of receiving the plug, the diaphragm in communication with the region for receiving the plug;
   b) depositing a sufficient amount of gel sealing material within the socket whereby upon insertion of the plug into the socket, gel sealing material is displaced into the elastomeric diaphragm causing the diaphragm to expand, said diaphragm thus providing an urging back pressure on the gel sealing material to seal the socket and plug connection.

2. The method of claim 1, wherein the step of depositing gel sealing material comprises the steps of:
   a) releasably mounting said socket, having the diaphragm attached thereto, on a gel filling fixture;
   b) depositing uncured silicone gel sealing material within said socket and diaphragm;
   c) curing said silicone gel sealing material within said socket; and
   d) removing said socket from said gel filling fixture.

3. The method of claim 1, wherein said attaching step comprises attaching an elastomeric diaphragm having a Shore A hardness from about 45 grams to about 75 grams.

4. The method of claim 1, wherein said depositing step comprises depositing gel sealing material comprising material selected from the group of aliphatic urethanes and styrene-ethylene-butylene-styrenes.

5. The method of claim 2, wherein said step of curing said silicone gel sealing material comprises curing said silicone gel sealing material to a Voland hardness of about 15 grams to about 50 grams.

6. The method of claim 2, wherein said step of curing said silicone gel sealing material comprises curing said silicone gel sealing material to a Voland hardness of about 25 grams to about 35 grams.

7. A method of sealing an electrical socket, comprising the steps of:
   a) releasably mounting said socket on a gel filling fixture;
   b) depositing silicone gel sealing material within said socket;
   c) curing said silicone gel sealing material within said socket; and
   d) removing said socket from said gel filling fixture.

8. The method of claim 7, wherein said depositing step comprises depositing gel sealing material comprising material selected from the group of aliphatic urethanes and styrene-ethylene-butylene-styrenes.

9. The method of claim 7, wherein said step of curing said silicone gel sealing material comprises curing said silicone gel sealing material to a Voland hardness of about 15 grams to about 50 grams.

10. The method of claim 7, wherein said step of curing said silicone gel sealing material comprises curing said silicone gel sealing material to a Voland hardness of about 25 grams to about 35 grams.

11. A method of sealing an electrical socket, the socket capable of receiving a plug in a region at a side of the socket, comprising the steps of:
    a) providing a gel filling fixture;
    b) releasably mounting said socket on said gel filling fixture;
    c) depositing silicone gel sealing material within said socket;
    d) curing said silicone gel sealing material within said socket so that a surface of said gel at said plug receiving region of said socket has a desired contour; and
    e) removing said socket from said gel filling fixture.

12. The method of claim 11, wherein said step of providing a gel filling fixture comprises providing a gel filling fixture having a fixture surface with a contour complementary to said desired contour, and wherein said mounting step comprises mounting said socket on said gel filling fixture with said fixture surface positioned at said plug receiving region of said socket.

13. The method of claim 11, wherein said depositing step comprises depositing gel sealing material comprising material selected from the group of aliphatic urethanes and styrene-ethylene-butylene-styrenes.

14. The method of claim 11, wherein said step of curing said silicone gel sealing material comprises curing said silicone gel sealing material to a Voland hardness of about 15 grams to about 50 grams.

15. The method of claim 11, wherein said step of curing said silicone gel sealing material comprises curing said silicone gel sealing material to a Voland hardness of about 25 grams to about 35 grams.

* * * * *